(No Model.)
R. W. CLARKE.
MEANS FOR ADJUSTING SAWS.
No. 323,912. Patented Aug. 11, 1885.
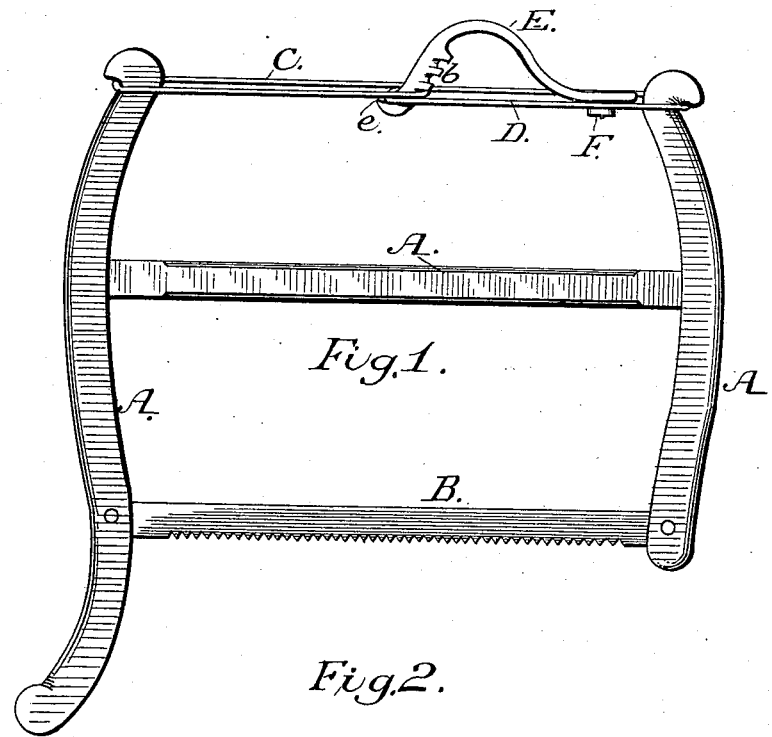
Fig. 1.
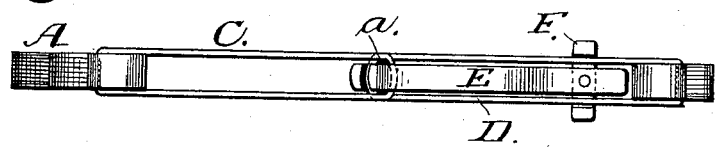
Fig. 2.
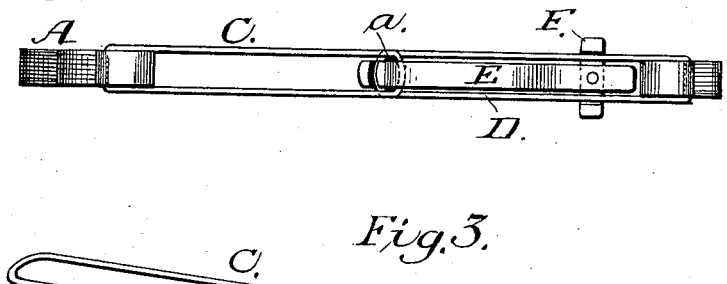
Fig. 3.
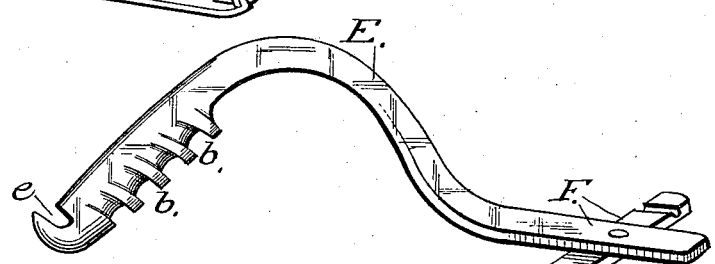
Attest;
T. Walter Fowler,
H. B. Applewhaite.
Inventor;
Royal W. Clarke
per attys.
A. H. Evans & Co.

United States Patent Office.

ROYAL W. CLARKE, OF RICHLAND CENTRE, WISCONSIN.

MEANS FOR ADJUSTING SAWS.

SPECIFICATION forming part of Letters Patent No. 323,912, dated August 11, 1885.

Application filed July 19, 1884. (No model.)

*To all whom it may concern:*

Be it known that I, ROYAL W. CLARKE, a citizen of the United States, residing at Richland Centre, in the county of Richland and State of Wisconsin, have invented certain new and useful Improvements in Means for Adjusting Saws, of which the following is a full, clear, and exact description, reference being had to the accompanying drawings, forming part of this specification, in which—

Figure 1 is a side elevation of a saw and frame with my improvements attached. Fig. 2 is a plan view of the same; Fig. 3, details of construction.

My invention relates to means for tightening the blades of saws; and it consists of two loops attached to the upper end of the frame, and a notched lever fulcrumed in said loops, and in the construction, arrangement, and combination of the several parts, all of which will be hereinafter more fully set forth, and specifically pointed out in the claims.

To enable others skilled in the art to make and use my invention, I will now proceed to describe the exact manner in which I have carried it out.

In the said drawings, A represents the frame of an ordinary handsaw, and B the saw-blade.

C and D represent loops or bands, made preferably of heavy wire, formed in one piece. One end of each of these loops is slipped over and secured by any well-known means to the upper portion of each of the sides of the frame, while their other ends project inward toward and slightly overlap each other, as shown in Fig. 2. By reason of the overlapping of the inner ends of the loops an opening, $a$, is formed, and through this opening is passed one end of a curved notched lever, E. This lever E is provided on one side with a series of notches, $b$, which are adapted to engage the inner end of loop C, while on the opposite side of the lever is formed a single notch, $e$, into which is passed the inner end of loop D, and which, in conjunction with said loop, forms a fulcrum for the lever. Near the outer end of the lever is pivotally secured a short bar or clamp, F, which, when the lever is down, as shown in Fig. 1, lies at right angles to the same and projects slightly beyond the sides of the loop D, and it may have formed on its upper face grooves for the reception of the sides of said loops, as shown in Fig. 2. Thus it is evident that by placing the end of loop C in any one of the series of notches $b$ the tension of the saw-blade is increased or diminished, when the clamp F, turned at right angles to the lever, as shown, prevents the lever from springing up.

Having thus described my invention, what I claim as new, and desire to secure by Letters Patent, is—

1. The combination, with a saw and frame, of the loops C and D and a notched lever fulcrumed in said loops, and having its free end secured by a clamp which engages one of the loops, substantially as described.

2. The combination, with a saw and frame, of a lever adapted to engage suitable loops, and a clamp whereby one end of the lever is secured to one of the loops, substantially as herein described.

3. In combination with the frame, the blade, and a lever, the loops or bands C and D, having one end secured to the frame, and the other extending inwardly and overlapping each other, to form an opening for the lever, substantially as and for the purpose herein set forth.

4. The combination, with a saw-frame and the loops C and D, constructed and arranged substantially as set forth, of a lever provided with a series of notches on one side and one or more notches on the opposite side, and a clamp pivotally secured to said lever, for the purpose set forth.

ROYAL W. CLARKE.

Witnesses:
WM. H. PIER,
J. H. YEAMAN.